United States Patent [19]

United States Patent [19]

Tanaka et al.

[11] Patent Number: 5,075,177
[45] Date of Patent: Dec. 24, 1991

[54] ALUMINUM ALLOY BEARING FOR USE IN LOW-RIGIDITY HOUSING AND METHOD OF PRODUCING SAME

[75] Inventors: Tadashi Tanaka, Konan; Masaaki Sakamoto, Nagoya; Yoshiaki Sato, Gifu; Tohru Kato, Seto, all of Japan

[73] Assignee: Daido Metal Company Ltd., Nagoya, Japan

[21] Appl. No.: 655,595

[22] Filed: Feb. 15, 1991

[30] Foreign Application Priority Data

Apr. 10, 1990 [JP] Japan .................................. 2-094224

[51] Int. Cl.[5] ........................ F16C 33/12; F16C 35/02
[52] U.S. Cl. .................................. 428/653; 428/650; 384/912; 228/235
[58] Field of Search ............... 428/643, 644, 645, 648, 428/650, 653, 684, 940; 384/912, 913; 228/235; 148/11.5 Q

[56] References Cited

U.S. PATENT DOCUMENTS

| 2,136,946 | 6/1935 | McCurdy | 384/912 |
| 3,167,404 | 1/1965 | Morrison et al. | 428/653 |
| 3,300,836 | 1/1967 | Slater et al. | 428/653 |
| 3,652,344 | 3/1972 | Kingsbury et al. | 428/653 |
| 3,732,083 | 5/1973 | LeBrasse et al. | 428/650 |
| 4,040,688 | 8/1977 | Grell | 384/912 |
| 4,189,525 | 2/1980 | Mori | 428/684 |
| 4,767,677 | 8/1988 | Kuwayama | 384/912 |
| 4,818,628 | 4/1989 | Alexander et al. | 384/912 |
| 4,877,696 | 10/1989 | Muto | 428/645 |

FOREIGN PATENT DOCUMENTS

| 36334988 | 4/1987 | Fed. Rep. of Germany | 428/650 |
| 574314 | 12/1945 | United Kingdom | 384/913 |
| 2067220A | 7/1981 | United Kingdom | 428/653 |
| 2186923A | 8/1987 | United Kingdom | 384/913 |

*Primary Examiner*—John J. Zimmerman
*Attorney, Agent, or Firm*—Browdy and Neimark

[57] ABSTRACT

An aluminum alloy bearing for use in a low-rigidity housing, includes a bearing aluminum alloy, and a steel back metal bonded to the bearing aluminum alloy. The steel back metal contains 0.16 to 0.35 wt. % of carbon, and the steel back metal has a hardness of Hv 200 to 280 and has an elastic limit of not less than 40 kgf/mm². For producing the aluminum alloy bearing, the back metal material is pressure-bonded to the bearing aluminum alloy in such a manner that the rolling reduction of the back metal material is 38 to 50%.

8 Claims, No Drawings

ALUMINUM ALLOY BEARING FOR USE IN LOW-RIGIDITY HOUSING AND METHOD OF PRODUCING SAME

BACKGROUND OF THE INVENTION

This invention relates to an aluminum alloy sliding bearing comprising a steel back metal and an aluminum bearing alloy, and also to a method of producing such a sliding bearing. More specifically, the present invention relates to an aluminum alloy sliding bearing which has an excellent fretting resistance to overcome the fretting of the bearing resulting from a lightweight and low-rigidity construction of a housing due to a small-size and lightweight construction and a high-speed and high-power design of a recently-developed internal combustion engine, and the present invention also relates to a method of producing such a sliding bearing. The term "fretting" means a surface damage developing when slight vibrations are present on a contact surface.

Various kinds of aluminum alloy sliding bearings are known. Generally, such an aluminum alloy sliding bearing has a bearing alloy layer (for example, of Al-Sn type, Al-Sn-Si type, Al-Zn type, or Al-Zn-Si type) formed on a surface of a back metal (JIS G3141 SPCC, SAE 1010, or the like). This back metal is usually made of low carbon steel having the carbon content of not more than 0.15%. Such low carbon steel has been used in order to reduce a deformation resistance encountered when plastically working the steel into a half-shell type configuration or a configuration with a flange.

However, in recent automobile engines, a high power output design by a high engine speed has been intended, and therefore an inertia force of a connecting rod is increased.

Therefore, in order to decrease the inertia force, the connecting rod is reduced in thickness to reduce its weight, which further reduces the rigidity of the connecting rod.

Also, there is a tendency that an engine block is made of an aluminum alloy in order to achieve a lightweight design, and as a result the engine block, like the connecting rod, has a low rigidity.

When the housing is thus reduced in rigidity, the bearing must have an increased amount of interference for mounting the bearing on the housing; otherwise the close contact between the bearing and the housing would be adversely affected at high temperatures or under a high load, which may often result in damage, such as fatigue and seizure, due to fretting or migration. The interference can be obtained by making the diameter of the bearing slightly greater than the diameter of the housing. Namely, the fixing of the bearing relative to a bore of the housing depends on such interference. Therefore, the amount of the interference is determined depending on the material, strength, etc., of the bearing and/or the housing. The term "migration" means that for example, a plating layer on the outer surface of the bearing is displaced out of place, or that foreign matters in a lubricant are moved to the outer surface of the bearing and/or the bore in the housing.

With respect to features of the conventional bearings, attention has been directed mainly to the properties of the bearing alloy, and with respect to the back metal, attention has been directed to its workability and its ability of bonding with the alloy.

However, with the high performance design of the recent automobile internal combustion engines, the total bearing performance, including not only the bearing properties of the bearing alloy but also the properties of the back metal, has now been required.

Particularly, recently, the engine tends to produce a high power output by a high engine speed, and the connecting rod tends to receive an increased inertia force due to such high engine speed.

Under the circumstances, the connecting rod tends to be reduced in thickness to reduce its weight in order to reduce the inertia force of the connecting rod, which further lowers the rigidity of the connecting rod.

Therefore, at high temperatures or at a high engine speed, the connecting rod is deformed under the influence of the heat and the inertia force because of its low rigidity. As a result, the close contact between the bearing and the housing is adversely affected, so that damage, such as fatigue and seizure, due to fretting and migration has been often encountered.

The engine block also increasingly tends to be made of an aluminum alloy in order to achieve its light-weight constriction. The aluminum alloy has a high thermal expansion coefficient of $23 \times 10^{-6}/°C.$, and the engine block is expanded at high temperatures, so that the close contact between the engine block with the outer surface of the metal of a sliding bearing is adversely affected, thereby causing damage due to fretting, as is the case with the connecting rod.

When the housing is thus reduced in rigidity, there is encountered damage, such as fatigue and seizure, due to fretting or migration.

In order to overcome these problems, it is necessary to increase the amount of the interference available when mounting the bearing so that the bearing can follow the deformation of the housing at high temperatures or under a high load; however, in the conventional bearing having the back metal made of low carbon steel, the strength of the back metal is low, and when the bearing is mounted on the housing under a high mounting stress, the back metal undesirably deformed beyond its elastic limit to cause permanent strain. Therefore, the intended object can not be achieved.

SUMMARY OF THE INVENTION

It is therefore an object of this invention to provide a novel aluminum alloy bearing which achieves excellent fretting resistance and migration resistance by the use of a high-rigidity and high-strength back metal having sufficient strength and toughness to withstand a high clamping force so that the bearing can be suitably used in a low-rigidity housing, such as a connecting rod reduced in rigidity for reducing an inertia force, and an aluminum block for lightweight purposes. Another object is to provide a method of producing such an aluminum alloy bearing.

According to the present invention, there is provided an aluminum alloy bearing for use in a low-rigidity housing, comprising a bearing aluminum alloy; and a steel back metal bonded to the bearing aluminum alloy; the steel back metal containing 0.16 to 0.35 wt.% of carbon, the steel back metal having a hardness of Hv 200 to 280 and having an elastic limit of not less than 40 kgf/mm².

Preferably, a flash plating layer having a thickness of 0.1 to 5 μm is formed on an outer surface of the steel back metal, the flash plating layer being made of a material selected from the group consisting of Sn, Pb and alloys thereof.

Preferably, the bearing aluminum alloy consists, by weight, of 3 to 40% Sn; 0.1 to 10% Pb; 0.2 to 5% Cu; 0.1 to less than 3% Si; 0.1 to less than 3% Sb, all of which constituents are ones indispensable to the alloy; at least one optional component of 0.01 to 3% selected from the group consisting of Mn, V, Mg, Ni, Co, Mo, Zr, Nb, Ti, and B; and the balance Al and incidental impurities.

Preferably, the bearing aluminum alloy consists, by weight, of 1 to 10% Zn; 1 to 12% Si; 0.1 to 5% Cu; 0.1 to 5% Pb, all of which constituents are ones indispensable to the alloy; at least one optional component of 0.05 to 5% selected from the group consisting of Mg, Ni, Mn, V, Co, Cr and Sr; and the balance Al and incidental impurities.

Damages apt to occur in the low-rigidity housing, such as fatigue and seizure due to a fretting abrasion and migration, can hardly be overcome with the conventional back metals. Therefore, in the present invention, the back metal with a higher carbon content is used, and its rigidity is enhanced by work hardening, thus improving and increasing the strength of the back metal.

The material for the steel back metal used in the present invention is selected from the group consisting of S20C, S30C, S17C, S22C, S25C, S28C and S33C (defined in JIS G4051).

Preferably, the thickness of this material is 0.8 to 20 mm. Preferably, the thickness of the aluminum bearing alloy is 0.2 to 3 mm.

The reasons for the limitation of the carbon content and the rolling reduction specified in the appended claims directed to the aluminum alloy bearing for the low-rigidity housing, as well as effects thereof, will now be described.

(1) Most of back metal materials used in the conventional bearings are made of low carbon steel having the carbon content of not more than 0.15%, because the plastic workability, obtainable when working such material into a half-shell type configuration or a configuration with a flange, is considered to be important.

The bearing for a low-rigidity housing need to have an increased amount of interference available when mounting the bearing on the housing, so as to absorb deformation of the housing. At this time, if the strength of the bearing is low (that is, the back metal is made of low carbon steel whose carbon content is not more than 0.15% as described above), the assembling stress surpasses the resisting force of the back metal, and the back metal is undesirably deformed beyond its elastic limit to cause permanent strain and yielding.

If the carbon content exceeds 0.35%, the toughness is adversely affected although the mechanical strength is improved. This reduces the plastic workability.

Therefore, the carbon content should be in the range of 0.16 to 0.35 wt.%.

(2) Generally, a steel material, when subjected to a plastic working, is increased in strength and hardness, and is reduced in elongation, and reduces toughness to be brittle.

If the rolling reduction of the stock steel strip is less than 37%, the intended mechanical strength is not obtained, and causes permanent strain and yielding, as described above. On the other hand, if the stock steel strip is subjected to a high rolling reduction more than 50%, the elongation is reduced, and the toughness is lowered, thus adversely affecting the mechanical strength.

Therefore, the rolling reduction of the steel strip at the time of the pressure bonding should be in the range of 38 to 50%.

(3) The flash plating reduces a load occurring when press-fitting the bearing of a bush type. Also, the flash plating relieves the concentration of stress, and reduces the friction coefficient of the contact surface. Therefore, the flash plating is effective against fretting.

If the thickness of the flash plating layer is less than 0.1 $\mu$m, its effect is low, and also if this thickness is more than 5 $\mu$m, its effect is also low, and in contrast such thickness is harmful, and constitutes a factor in the occurrence of migration.

Therefore, the thickness of the flash plating layer should be in the range of 0.1 to 5 $\mu$m.

DESCRIPTION OF THE INVENTION

The invention will now be illustrated by way of the following Examples:

EXAMPLE 1

Strips of steel (JIS G3141 SPCC; JIS G4051 S17C to S35C) having a width of 110 mm and a thickness of 2.24 mm were prepared as materials for back metals. Each steel strip and each of aluminum bearing alloys (having a thickness of 1 mm) shown in Table 5 was pressure-bonded together by rolling so as to provide a respective one of rolling reduction of the steel strips shown in Table 1. Then, each composite material thus produced was heat-treated at 350° C. for 4.5 hours, and then was worked into a semi-cylindrical shape having an outer diameter of 56 mm, a thickness of 1.5 mm and a width of 26 mm, thus forming a sliding bearing.

Next, for examining the mechanical strength of the steel back metals by way of comparison, tensile test pieces (JIS No. 5) were prepared therefrom, and various tests were conducted. The test piece was prepared by removing the aluminum alloy entirely from the sliding bearing, thus leaving the back metal alone. Results of the tests are shown in Table 1.

EXAMPLE 2

Each of four kinds of sliding bearings, that is, Sample Nos. 2, 4, 7 and 8 in Table 1, was mounted on an actual device under a bearing stress of 25 to 30 kgf/mm$^2$, and a test was conducted. Results of the test are shown in Table 2.

Sliding bearing (that is, a bush type) were produced from three kinds of bimetals of Sample Nos. 1, 4 and 8, and each of the sliding bearing thus formed was press-fitted into an aluminum housing (Al-Si type housing) for the purpose of a press-fitting test.

The test metals of each Sample included ones with a 3 $\mu$m-thick flash plating layer and ones without a flash plating layer.

Results of the press-fitting test are shown in Table 3.

In order to examine the amount of a permanent strain in the test metals used for the press-fitting test, a thermal cycle test was conducted.

In this test, a thermal cycle between room temperature and −40° C. was repeated 10 times. The retention time for each of the room temperature and −40° C. was one hour.

For evaluation, the bushing was removed from the housing after the test, and the dimension of the bushing was measured, and the permanent strain was determined by a difference between its outer diameter after the test and its outer diameter before the pressfitting.

Results thereof are shown in Table 4.

(1) As is clear from the test results of Table 1, the mechanical strength is closely related to the carbon content and the rolling reduction, and the strength and hardness increase with the increase of the carbon content and the rolling reduction.

The products (Nos. 1 to 6) of the present invention are much improved in strength and hardness over the conventional products (Nos. 7, 8 and 9).

In the actual device test, fretting damage occurred in the conventional products (Nos. 7 and however, fretting was not found in the products (Nos. and 4) of the present invention.

In the case where there is involved a high bearing stress, that is, an increased amount of interference, in connection with a low-rigidity housing, the heretofore-used material of a low strength is deformed beyond the elastic limit, thus causing a permanent strain.

Therefore, since the amount of interference can be increased without causing any scoring, a fretting resistance can be improved.

(3) As is clear from the test results of Table 4, the products of the present invention have a smaller amount of the permanent strain than the conventional products. Namely, the products of the present invention have a good ability to follow the deformation of the housing, and therefore the close contact thereof with the housing is improved, thus providing superior resistance against the fretting and the migration.

The aluminum alloy sliding bearings of the present invention for the low-rigidity housing are higher in the strength of the back metal than the conventional products, and have an excellent ability to follow the deformation of the housing. Therefore, it is clear that the aluminum alloy bearings of the present invention have excellent fretting resistance and migration resistance.

TABLE 1

| Kind | Sample No. | Rolling reduction of steel strip (%) | Carbon content (%) | Tensile strength (kgf/mm$^2$) | 0.2% yield strength (kgf/mm$^2$) | Proportional limit (kgf/mm$^2$) | Elongation (%) | Hardness (Hv10) |
|---|---|---|---|---|---|---|---|---|
| Products of present invention | 1 | 38 | 0.20 | 67.5 | 65.1 | 65.1 | 9.0 | 223 |
|  | 2 | 45 | 0.20 | 69.4 | 66.5 | 66.5 | 4.1 | 226 |
|  | 3 | 50 | 0.20 | 72.1 | 68.7 | 68.7 | 2.4 | 235 |
|  | 4 | 38 | 0.30 | 76.0 | 73.5 | 73.5 | 3.5 | 240 |
|  | 5 | 45 | 0.30 | 80.0 | 76.3 | 76.3 | 2.5 | 249 |
|  | 6 | 50 | 0.30 | 82.3 | 79.5 | 79.5 | 1.0 | 255 |
| Conventional products | 7 | 40 | 0.05 | 55.1 | 52.5 | 52.5 | 12.0 | 187 |
|  | 8 | 50 | 0.05 | 57.0 | 54.8 | 54.8 | 10.1 | 193 |
|  | 9 | 60 | 0.05 | 62.3 | 59.5 | 59.5 | 7.5 | 199 |

The products of the present invention have high strength and toughness, as well as an excellent ability to prevent the permanent strain from occurring in the housing, and therefore exhibit a superior fretting resistance.

(2) As is clear from Table 3, those products with the Sn-flash plating layer on the metal are around 25% lower is press-fitting load than those products without such flash plating layer, and are not subjected to scoring.

TABLE 2

| Kind | Sample No. | Results of actual device test |
|---|---|---|
| Products of present invention | 2 | No fretting damage |
|  | 4 | No fretting damage |
| Conventional products | 7 | Fretting damage occurred |
|  | 8 | Fretting damage occurred |

TABLE 3

| Kind | Sample No. | Bushing No. | Outer diameter of bushing (mm) | Inner diameter of housing (39.000 = 0 μm) | Interference (mm) | Press-fitting load (kg) | Scoring* at time of press-fitting |
|---|---|---|---|---|---|---|---|
| Products of present invention | 1 with Sn flash plating | 1 | 39.174 | 0 | 0.174 | 1685 | None |
|  |  | 2 | 39.174 | 0 | 0.174 | 1695 | None |
|  |  | 3 | 39.175 | −1 | 0.176 | 1700 | None |
|  | without Sn flash plating | 4 | 39.175 | 1 | 0.174 | 2215 | Occurred |
|  |  | 5 | 39.174 | 0 | 0.174 | 2260 | Occurred |
|  |  | 6 | 39.174 | −1 | 0.175 | 2245 | Occurred |
|  | 4 with Sn flash plating | 7 | 39.175 | −1 | 0.176 | 1685 | None |
|  |  | 8 | 39.175 | −1 | 0.176 | 1685 | None |
|  |  | 9 | 39.175 | 1 | 0.174 | 1690 | None |
|  | without Sn flash plating | 10 | 39.175 | 0 | 0.175 | 2180 | Occurred |
|  |  | 11 | 39.174 | 0 | 0.174 | 2200 | Occurred |
|  |  | 12 | 39.174 | −1 | 0.175 | 2175 | Occurred |
| Conventional products | 8 with Sn flash plating | 13 | 39.173 | −4 | 0.177 | 1690 | None |
|  |  | 14 | 39.174 | −4 | 0.178 | 1680 | None |
|  |  | 15 | 39.174 | −3 | 0.177 | 1680 | None |
|  | without Sn flash plating | 16 | 39.174 | −2 | 0.176 | 2060 | Occurred |
|  |  | 17 | 39.175 | −2 | 0.177 | 2100 | Occurred |
|  |  | 18 | 39.175 | 0 | 0.175 | 2170 | Occurred |

*"Scoring at time of press-fitting" means that when the bearing of the bushing type is to be press-fitted (press-fixed) in the housing, the outer surface of the bearing and the housing are in abrasive contact with each other, thereby causing wear.

TABLE 4

| Kind | Sample No. | Bushing No. | Outer diameter of bushing before test (mm) | Outer diameter of bushing after test (mm) | Amount of permanent fatigue* (μ) |
|---|---|---|---|---|---|
| Products of present invention | 1 with Sn flash plating | 1 | 39.174 | 39.156 | 18 |
|  |  | 2 | 39.174 | 39.155 | 19 |
|  |  | 3 | 39.175 | 39.157 | 18 |
|  | without Sn flash plating | 4 | 39.175 | 39.158 | 17 |
|  |  | 5 | 39.174 | 39.155 | 19 |
|  |  | 6 | 39.174 | 39.156 | 18 |
|  | 4 with Sn flash plating | 7 | 39.175 | 39.155 | 20 |
|  |  | 8 | 39.175 | 39.158 | 17 |
|  |  | 9 | 39.175 | 39.160 | 15 |
|  | without Sn flash plating | 10 | 39.175 | 39.156 | 19 |
|  |  | 11 | 39.174 | 39.158 | 16 |
|  |  | 12 | 39.174 | 39.161 | 13 |
| Conventional products | 8 with Sn flash plating | 13 | 39.173 | 39.133 | 40 |
|  |  | 14 | 39.174 | 39.144 | 30 |
|  |  | 15 | 39.174 | 39.146 | 28 |
|  | without Sn flash plating | 16 | 39.174 | 39.136 | 38 |
|  |  | 17 | 39.175 | 39.143 | 32 |
|  |  | 18 | 39.175 | 39.145 | 30 |

*"Amount of permanent strain" means the amount of deformation occurring when the bearing of the bushing type goes beyond its yield point, so that a sufficient stress to keep the bearing in close contact with the housing is not available.

TABLE 5

| Kind | Sample No. | Chemical components (wt. %) | | | | | | | | |
|---|---|---|---|---|---|---|---|---|---|---|
|  |  | Al | Si | Sn | Cu | Pb | Sb | Zn | Mn | V |
| Products of present invention | 1 | Rem. | — | 20 | 1.0 | — | — | — | — | — |
|  | 2 | Rem. | 2.5 | 12 | 1.0 | 1.4 | 0.3 | — | 0.4 | 0.12 |
|  | 3 | Rem. | 6.0 | — | 1.2 | 1.0 | — | 4.0 | — | — |
|  | 4 | Rem. | — | 20 | 1.0 | — | — | — | — | — |
|  | 5 | Rem. | 2.5 | 12 | 1.0 | 1.4 | 0.3 | — | 0.4 | 0.12 |
|  | 6 | Rem. | 6.0 | — | 1.2 | 1.0 | — | 4.0 | — | — |
| Conventional products | 7 | Rem. | — | 20 | 1.0 | — | — | — | — | — |
|  | 8 | Rem. | 2.5 | 12 | 1.0 | 1.4 | 0.3 | — | 0.4 | 0.12 |
|  | 9 | Rem. | 6.0 | — | 1.2 | 1.0 | — | 4.0 | — | — |

What is claimed is:

1. An aluminum alloy bearing for use in a low-rigidity housing, comprising a bearing aluminum alloy; and steel back metal bonded to said bearing aluminum alloy; said steel back metal containing 0.16 to 0.35 wt. % of carbon, said steel back metal having a hardness of Hv 200 to 280 and having an elastic limit of not less than 40 kgf/mm².

2. An aluminum alloy bearing according to claim 1, in which a flash plating layer having a thickness of 0.1 to 5 μm is formed on an outer surface of said steel back metal, said flash plating layer being made of a material selected from the group consisting of Sn, Pb and alloys thereof.

3. An aluminum alloy bearing according to claim 1, in which said bearing aluminum alloy consists, by weight, of 3 to 40% Sn; 0.1 to 10% Pb; 0.2 to 5% Cu; 0.1 to less than 3% Si; 0.1 to less than 3% Sb, all of which constituents are ones indispensable to said alloy; at least one optional component of 0.01 to 3% selected from the group consisting of Mn, V, Mg, Ni, Co, Mo, Zr, Nb, Ti and B; and the balance Al and incidental impurities.

4. An aluminum alloy bearing according to claim 1, in which said bearing aluminum alloy consists, by weight, of 1 to 10% Zn; 1 to 12% Si; 0.1 to 5% Cu; 0.1 to 5% Pb, all of which constituents are ones indispensable to said alloy; at least one optional component of 0.05 to 5% selected from the group consisting of Mg, Ni, Mn, V, Co, Cr and Sr; and the balance Al and incidental impurities.

5. A method of producing an aluminum alloy bearing for use in a low-rigidity housing, said aluminum alloy bearing comprising a bearing aluminum alloy, and a steel back metal bonded to said bearing aluminum alloy, said method comprising the step of:
    pressure-bonding a strip of steel, containing 0.16 to 0.35 wt. % of carbon, to a bearing aluminum alloy strip to form a composite material, the rolling reduction of said steel strip at the time of said pressure bonding being 38 to 50%, said steel back metal defined by said strip steel of said composite material having a hardness of Hv 200 to 280, and said steel back metal having an elastic limit of not less than 40 kgf/mm².

6. A method according to claim 5, in which a flash plating layer having a thickness of 0.1 to 5 μm is formed on an outer surface of said steel back metal, said flash plating layer being made of a material selected from the group consisting of Sn, Pb and alloys thereof.

7. A method according to claim 5, in which said bearing aluminum alloy consists, by weight, of 3 to 40% Sn; 0.1 to 10% Pb; 0.2 to 5% Cu; 0.1 to less than 3% Si; 0.1 to less than 3% Sb, all of which constituents are ones indispensable to said alloy; at least one optional component of 0.01 to 3% selected from the group consisting of Mn, V, Mg, Ni, Co, Mo, Zr, Nb, Ti and B; and the balance Al and incidental impurities.

8. A method according to claim 5, in which said bearing aluminum alloy consists, by weight, of 1 to 10% Zn; 1 to 12% Si; 0.1 to 5% Cu; 0.1 to 5% Pb, all of which constituents are ones indispensable to said alloy; at least one optional component of 0.05 to 5% selected from the group consisting of Mg, Ni, Mn, V, Co, Cr and Sr; and the balance Al and incidental impurities.

* * * * *